US010949342B2

(12) United States Patent
Chakrabarti et al.

(10) Patent No.: US 10,949,342 B2
(45) Date of Patent: Mar. 16, 2021

(54) PERSISTENT MEMORY GARBAGE COLLECTION

(71) Applicant: Hewlett Packard Enterprise Development LP, Houston, TX (US)

(72) Inventors: Dhruva Chakrabarti, San Jose, CA (US); Kumud Bhandari, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 297 days.

(21) Appl. No.: 15/538,377

(22) PCT Filed: Jan. 9, 2015

(86) PCT No.: PCT/US2015/010862
§ 371 (c)(1),
(2) Date: Jun. 21, 2017

(87) PCT Pub. No.: WO2016/111702
PCT Pub. Date: Jul. 14, 2016

(65) Prior Publication Data
US 2017/0351606 A1    Dec. 7, 2017

(51) Int. Cl.
*G06F 12/02* (2006.01)
*G06F 16/00* (2019.01)
(52) U.S. Cl.
CPC .......... *G06F 12/0253* (2013.01); *G06F 16/00* (2019.01); *G06F 12/0238* (2013.01)
(58) Field of Classification Search
CPC ... G06F 12/0253; G06F 16/00; G06F 12/0238
See application file for complete search history.

(56) References Cited

U.S. PATENT DOCUMENTS

2005/0172271 A1* 8/2005 Spertus ............... G06F 11/3664
717/125
2006/0265438 A1 11/2006 Shankar et al.
(Continued)

FOREIGN PATENT DOCUMENTS

| WO | WO-2013100935 A1 | 7/2013 |
| WO | WO-2014117328 A1 | 8/2014 |
| WO | WO-2014144580 A1 | 9/2014 |

OTHER PUBLICATIONS

Gao et al ~"Using Managed Runtime Systems to Tolerate Holes in Wearable Memories"~ PLDI'13~ Jun. 2013 ~ 12 pages.
(Continued)

*Primary Examiner* — David Yi
*Assistant Examiner* — Nicholas A. Paperno
(74) *Attorney, Agent, or Firm* — Mannava & Kang, P.C.

(57) ABSTRACT

According to an example, persistent memory garbage collection may include determining whether termination of a program is based on a specified termination of the program during execution of the program or an unspecified termination of the program during the execution of the program. In response to a determination that the termination of the program is based on the specified termination of the program during the execution of the program, persistent metadata stored in a persistent memory may be used to restart the program. In response to a determination that the termination of the program is based on the unspecified termination of the program during the execution of the program, the persistent metadata stored in the persistent memory may be used to collect garbage from the persistent memory and to restart the program.

19 Claims, 9 Drawing Sheets

(56) References Cited

U.S. PATENT DOCUMENTS

| | | |
|---|---|---|
| 2006/0294165 A1 | 12/2006 | Bacon et al. |
| 2007/0022149 A1 | 1/2007 | Bacon et al. |
| 2007/0220328 A1* | 9/2007 | Liu .................... G06F 11/1435 714/24 |
| 2009/0327374 A1 | 12/2009 | Wright et al. |
| 2010/0088467 A1 | 4/2010 | Lee et al. |
| 2012/0109909 A1* | 5/2012 | Hugly ................. H03M 7/3084 707/693 |
| 2012/0239871 A1* | 9/2012 | Badam ................ G06F 12/0246 711/104 |
| 2013/0290382 A1* | 10/2013 | Adachi .............. G06F 12/0253 707/813 |
| 2014/0115291 A1* | 4/2014 | Caspole ............. G06F 12/0269 711/166 |
| 2015/0006843 A1* | 1/2015 | Moser ................ G06F 12/0253 711/170 |
| 2016/0179687 A1* | 6/2016 | Kumar ............... G06F 12/0891 711/135 |

OTHER PUBLICATIONS

International Searching Authority, The International Search Report and the Written Opinion, PCT/US2015/010862, dated Sep. 15, 2015, 11 Pages.

Moraru et al ~"Persistent, Protected and Cached: Building Blocks for Main Memory Data Stores"~ CMU-PDL-11-114 ~ Dec. 2011 ~ 24 pages.

* cited by examiner

```
find-space(req-size /*num of pages*/){ persistent_root  //persistent field to store address of some persistent object
temp_address     //transient variable to hold temporary persistent address
1:  temp_addr = nvm_malloc(size);  //persistent memory allocation
2:  *temp_addr = ....;  //persistent memory initialization
3:  persistent_root = temp_addr;
```

FIG. 3

```
1: persistent_root  //persistent pointer
2: array //temporary variables
3: START_FAILURE_ATOMIC
4: array = nvm_malloc(2 * sizeof(int));  //allocate int array[2]
5: initialize_array(array);  //manipulate
6: if (array[0] > array[1]){
7:     array[0] = -10;
8:     array[1] = 10;
9: }
10: if (array[1] > array[0]){
11:     //make array visible in persistent memory
12:     //in the absence of failure atomic section
13:     persistent_root = array  //publish
14: } else
15:     free(array)
16: END_FAILURE_ATOMIC
```

```
DETERMINE WHETHER TERMINATION OF A PROGRAM IS BASED
ON A SPECIFIED TERMINATION OF THE PROGRAM DURING
EXECUTION OF THE PROGRAM OR AN UNSPECIFIED
TERMINATION OF THE PROGRAM DURING THE EXECUTION OF
THE PROGRAM
602
```

↓

```
IN RESPONSE TO A DETERMINATION THAT THE
TERMINATION OF THE PROGRAM IS BASED ON THE
SPECIFIED TERMINATION OF THE PROGRAM DURING
THE EXECUTION OF THE PROGRAM, UTILIZE
PERSISTENT METADATA STORED IN A PERSISTENT
MEMORY TO RESTART THE PROGRAM
604
```

↓

```
IN RESPONSE TO A DETERMINATION THAT THE TERMINATION OF THE
PROGRAM IS BASED ON THE UNSPECIFIED TERMINATION OF THE
PROGRAM DURING THE EXECUTION OF THE PROGRAM, UTILIZE THE
PERSISTENT METADATA STORED IN THE PERSISTENT MEMORY TO
COLLECT GARBAGE FROM THE PERSISTENT MEMORY AND TO
RESTART THE PROGRAM
606
```

```
┌─────────────────────────────────────────────────────┐
│ DETERMINE WHETHER TERMINATION OF A PROGRAM IS BASED │
│ ON A SPECIFIED TERMINATION OF THE PROGRAM DURING    │
│ EXECUTION OF THE PROGRAM OR AN UNSPECIFIED          │
│ TERMINATION OF THE PROGRAM DURING THE EXECUTION OF  │
│ THE PROGRAM                                         │
│ 702                                                 │
└─────────────────────────────────────────────────────┘
                          │
                          ▼
┌─────────────────────────────────────────────────────┐
│ IN RESPONSE TO A DETERMINATION THAT THE             │
│ TERMINATION OF THE PROGRAM IS BASED ON THE          │
│ SPECIFIED TERMINATION OF THE PROGRAM DURING         │
│ THE EXECUTION OF THE PROGRAM, UTILIZE               │
│ PERSISTENT METADATA STORED IN A PERSISTENT          │
│ MEMORY TO RESTART THE PROGRAM                       │
│ 704                                                 │
└─────────────────────────────────────────────────────┘
                          │
                          ▼
┌─────────────────────────────────────────────────────┐
│ DETERMINE AN OFFLINE MODE THAT IS INDEPENDENT FROM THE │
│ EXECUTION OF THE PROGRAM                            │
│ 706                                                 │
└─────────────────────────────────────────────────────┘
                          │
                          ▼
┌─────────────────────────────────────────────────────┐
│ IN RESPONSE TO A DETERMINATION THAT THE TERMINATION OF THE │
│ PROGRAM IS BASED ON THE UNSPECIFIED TERMINATION OF THE     │
│ PROGRAM DURING THE EXECUTION OF THE PROGRAM, UTILIZE THE   │
│ PERSISTENT METADATA STORED IN THE PERSISTENT MEMORY TO     │
│ COLLECT GARBAGE FROM THE PERSISTENT MEMORY IN THE OFFLINE  │
│ MODE AND TO RESTART THE PROGRAM                            │
│ 708                                                        │
└─────────────────────────────────────────────────────┘
```

FIG. 7

PERSISTENT MEMORY GARBAGE COLLECTION

BACKGROUND

In computer systems, memory refers to the physical devices used to store programs (e.g., sequences of machine readable instructions) or data (e.g., program state information) on a temporary or permanent basis for use in a computer or other digital electronic device. With respect to memory, garbage collection is a form of memory management. Garbage collection includes reclaiming garbage or memory occupied by objects that are no longer in use by a program.

BRIEF DESCRIPTION OF DRAWINGS

Features of the present disclosure are illustrated by way of example and not limited in the following figure(s), in which like numerals indicate like elements, in which:

FIG. 3 illustrates allocation, initialization, and publication of persistent data, according to an example of the present disclosure;

FIG. 4 illustrates a failure atomic section in the absence of an offline garbage collection module, according to an example of the present disclosure;

FIG. 6 illustrates a method for persistent memory garbage collection, according to an example of the present disclosure;

FIG. 7 illustrates further details of the method for persistent memory garbage collection, according to an example of the present disclosure;

DETAILED DESCRIPTION

For simplicity and illustrative purposes, the present disclosure is described by referring mainly to examples. In the following description, numerous specific details are set forth in order to provide a thorough understanding of the present disclosure. It will be readily apparent however; that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to; the term "including" means including but not limited to. The term "based on" means based at least in part on.

Figure 2:
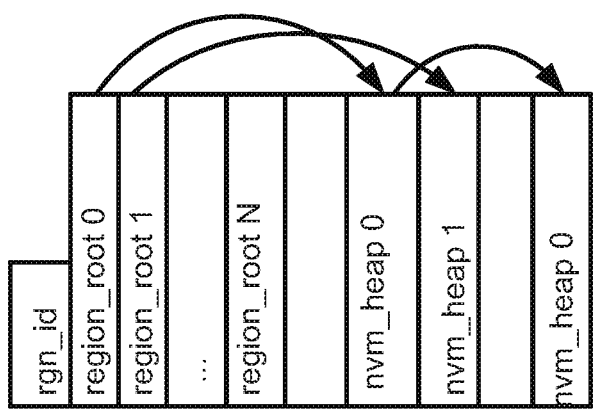
FIG. 2 illustrates a persistent region of a persistent memory, according to an example of the present disclosure.

In computer systems, persistent memory includes any type of memory for efficiently storing data structures such that the data structures can continue to be accessed using memory instructions or memory application programming interfaces (APIs) even after the end of the process that created or last modified the data structures. FIG. 2 illustrates a persistent region of a persistent memory, according to an example of the present disclosure. A persistent region may represent a contiguous space of memory in non-volatile random-access memory (NVRAM) identified by a unique identification (ID) (e.g., rgn_id). A dynamically allocated persistent memory (i.e., a persistent heap) may exist within the realm of a persistent region. For example, FIG. 2 illustrates nvm_heap 0 (i.e., non-volatile memory (NVM) heap 0), and nvm_heap 1. More than one persistent heap managed under separate memory management schemes may exist within the same region. A persistent region may include a set of persistent roots which stores the starting addresses of each separately managed persistent heap existing within a region. For example, referring to FIG. 2, nvm_heap 0 and nvm_heap 1 are two examples of such persistent heaps being managed under two separate memory allocation schemes. A persistent heap may not be contiguous as a result of expanding a persistent heap, but all different dis-contiguous sections of the persistent heap may lie within the same region. For the example of FIG. 2, nvm_heap 0, which has two dis-contiguous sections, is an example of such a persistent heap.

In computer systems, persistent memory technologies may be available to user-level programs as large, byte-addressable NVRAM, complementing the existing dynamic random-access memory (DRAM). A computer program (i.e., machine readable instructions) that manipulates persistent data residing in NVRAM and expects the data to be reused beyond the program's lifetime should do so in a manner that preserves the consistent state of the data beyond tolerated failures and system restarts (i.e., for a system that hosts or otherwise utilizes the computer program). Furthermore, in order to utilize the available NVM space, such a computer program should not permanently leak memory as a result of a failure or a programming error. A permanent memory leak in NVRAM may be more harmful than for transient memory because such leaks may accumulate over time and consume a relatively large portion of the memory. Even a program that is considered leak-free may cause memory leaks when manipulating persistent data due to events such as failures that are beyond the control of a programmer.

With respect to consistency of the state of the data beyond tolerated failures and computer system restarts, computer programs should be written with contingency for tolerated failures (e.g., process failures, kernel panics, power outages, etc.) so that the consistency of the persistent data is guaranteed across such failures, and hence the persistent data is reusable. For example, FIG. 3 illustrates allocation, initialization, and publication of persistent data, according to an example of the present disclosure. Statement-1 may represent allocation of memory, statement-2 may represent initialization of the memory allocated in statement-1, and statement-3 may represent publication, where a pointer to the newly allocated memory may be assigned to a globally visible location (e.g., the persistent_root). For a scenario where effects of program statements become visible in NVRAM in order of statement-1, statement-3, and statement-2, memory may be allocated and published externally but that memory has not yet been initialized. The above reordering may be possible in a system with out-of-order execution processors and data caches positioned in between NVRAM and the processor. Assuming such caches are volatile, a failure after the execution of statement-1 leaves a dangling pointer in the persistent heap, while a failure after the execution of statement-1 and statement-3, and before the execution of statement-2, leaves a pointer to an uninitialized address in the persistent heap.

With respect to memory leakage as a result of a failure or a programming error, a failure or a programming error should not make some part of NVRAM permanently inaccessible in the form of permanent leaks. For the example of FIG. 3, according to another scenario where the effects of the program statements become visible in the order of the program statement-1, statement-2, and statement-3, even in such a scenario, without any contingency to reclaim memory after tolerated failures, such a failure anywhere after the execution of statement-1 and before the execution of statement-3, may cause a permanent memory leak. In this regard, a leak in persistent memory may be permanent as it may not be resolved by restarting a system, and may further build up to consume a relatively large portion of the persistent memory.

Garbage collection for persistent memory includes a close operational connection between a memory allocator and a garbage collector. A memory allocator may allocate portions of memory to programs at their request, and free portions of the memory for reuse when no longer needed. In an unmanaged environment (e.g., C/C++), garbage collection is based on locating all pointers (or references) in program data structures. For example, a memory analyzer that operates in conjunction with the memory allocator examines a bit pattern to determine whether the bit pattern is a pointer. If the memory analyzer determines that the bit pattern appears to be a pointer, the memory analyzer interprets the bit pattern as a pointer. Based on this interpretation of pointers, a mark-sweep garbage collection operation follows these pointers to mark all reachable locations in the memory. Any object that is not marked is garbage and is reclaimed (e.g., via a sweep operation) by the garbage collector. This technique is conservative since objects that are actually garbage appear reachable based on pointers and hence are not claimed. However, some objects that are garbage may appear reachable and may not be claimed. This may occur because of inherent inaccuracies in pointer identification.

In order to address the aforementioned aspects related to persistent memory, according to examples, a persistent memory garbage collection apparatus and a method for persistent memory garbage collection are disclosed herein. The apparatus and method may generally provide for the management of internal persistent garbage collection data structures in a failure-resilient manner and with minimum execution overhead. This ensures that on re-execution (e.g., of an application including machine readable instructions), the memory allocation module for the persistent memory continues to function correctly. For example, in the event of failure, the garbage collection data structures may not be re-usable in further instantiations of an application. The apparatus and method disclosed herein may also ensure that the memory allocation module performance is not degraded, and recovery (if any, after a failure) is achieved in an expedited manner. Further, the apparatus and method disclosed herein may reduce memory leaks for persistent memory while maintaining high performance of the memory allocation module.

The apparatus and method disclosed herein generally provide for dynamic management of persistent memory that combines the performance benefits of explicit persistent memory management online (i.e., when an application is being executed) with the safety benefits of an offline cleanup/recovery time conservative garbage collection. In this regard, for the apparatus and method disclosed herein, a specified recovery time against memory leaks may improve both the performance as well as the programmability of the persistent memory APIs by removing the restriction on the placement of memory management operations in relation to failure atomic sections. Thus, the apparatus and method disclosed herein may provide a failure resilient memory allocation module that allocates persistent memory and provides for explicit persistent memory management during the execution of a program while reclaiming leaked persistent memory during cleanup after a normal exit from a program, or during a recovery phase after an abnormal exit a program. In this regard, the phase of persistent memory management (e.g., via a memory management scheme (MMS) as described herein) where a mutator (i.e., to control changes to a variable) is absent may be designated as offline, and the phase of persistent memory management where the mutator is executing as online. Hence, for the apparatus and method disclosed herein, the memory allocation module and the garbage collection module may execute on two distinct phases including online and offline. These aspects may provide the performance benefits of explicit online memory management (i.e. without incurring the overhead of online garbage collection), while still providing the safety of an offline memory reclamation.

With respect to offline garbage collection, absent an offline garbage collection module, the failure atomic sections of a persistent memory may unnecessarily consume an extensive amount of the persistent memory. A failure atomic section may be used to specify an all or nothing behavior of updates to persistent memory in that section. In this regard, FIG. 4 illustrates a failure atomic section in the absence of an offline garbage collection module, according to an example of the present disclosure. Referring to FIG. 4, an array of two elements may be allocated in persistent memory in statement-4, initialized and manipulated in statements 5-9, and reachability from a persistent root may be established in statements 10-12. In the absence of an offline garbage collection module as disclosed herein, statements 4-14 may need to be enclosed in a failure atomic section because a failure anywhere after the execution of statement-4 and before the execution of either statement-12 or statement-14 may leak memory. Stores to persistent locations within failure atomic sections may incur performance overhead based on a mechanism used to implement failure atomicity (e.g., transactional logs). The presence of an offline garbage collection module as disclosed herein may allow placement of the allocation (e.g., nvm malloc on statement-4) and deallocation (e.g., free on statement-14) clauses to be placed outside the failure atomic section in the example of FIG. 4.

With respect to offline garbage collection, the offline garbage collection module of the apparatus and method disclosed herein may turn failures from resource leaking events to resource freeing opportunities. These aspects may provide for more frequent staging of such failures as a part of ongoing software (i.e., machine readable instructions) development or maintenance. These aspects may also facilitate testing of recovery logic to mitigate the effect of actual failures.

For the apparatus and method disclosed herein, the DRAM and NVRAM may be both available simultaneously as byte-addressable memory to user programs mapped into a same virtual address space and accessible through central processing unit (CPU) load and store instructions. With respect to caches located between the DRAM and NVRAM and the CPU, hierarchies of volatile caches may be shared by both the DRAM and NVRAM. These caches may treat volatile and non-volatile data equally. For the apparatus and method disclosed herein, an underlying system may provide a mechanism such as clflush instructions to guarantee the visibility of writes to the persistent memory locations.

The apparatus and method disclosed herein may provide for the toleration of any software and system failures such as program aborts, kernel panics, and power failures without any additional changes to an existing architecture's instruction set architecture or the microarchitecture. In the offline mode, the apparatus and method disclosed herein may include a MMS that is implemented by the memory allocation module to detect failure during the last allocation or collection cycle related to a persistent memory, and the nature of a failure. The MMS may invoke recovery logic to re-establish internal consistency as a part of an offline restart logic.

The apparatus and method disclosed herein may utilize a conservative mark-and-sweep operation for the garbage collection module to distinguish valid memory addresses from arbitrary bit patterns in the persistent heap and to determine the size of the memory space pointed by a valid persistent heap address so that all bit patterns may be examined. For the mark-and-sweep operation for the garbage collection module, any bit pattern that is not within a range of maximum and minimum persistent heap addresses may be discarded. If a bit pattern is within the range of maximum and minimum persistent heap address, if such a bit pattern points to the unallocated portion of the persistent heap, such a bit pattern may also be discarded. If a bit pattern is within the range of maximum and minimum persistent heap address but does not point to the unallocated portion of the persistent heap, if such a bit pattern points to the middle of the allocated block, such a bit pattern may also be discarded. Further, if a bit pattern is within the range of maximum and minimum persistent heap address but does not point to the unallocated portion of the persistent heap and does not point to the middle of the allocated block, such a bit pattern may be considered a valid address and the allocated objects that is referenced to may be retained.

Figure 1:
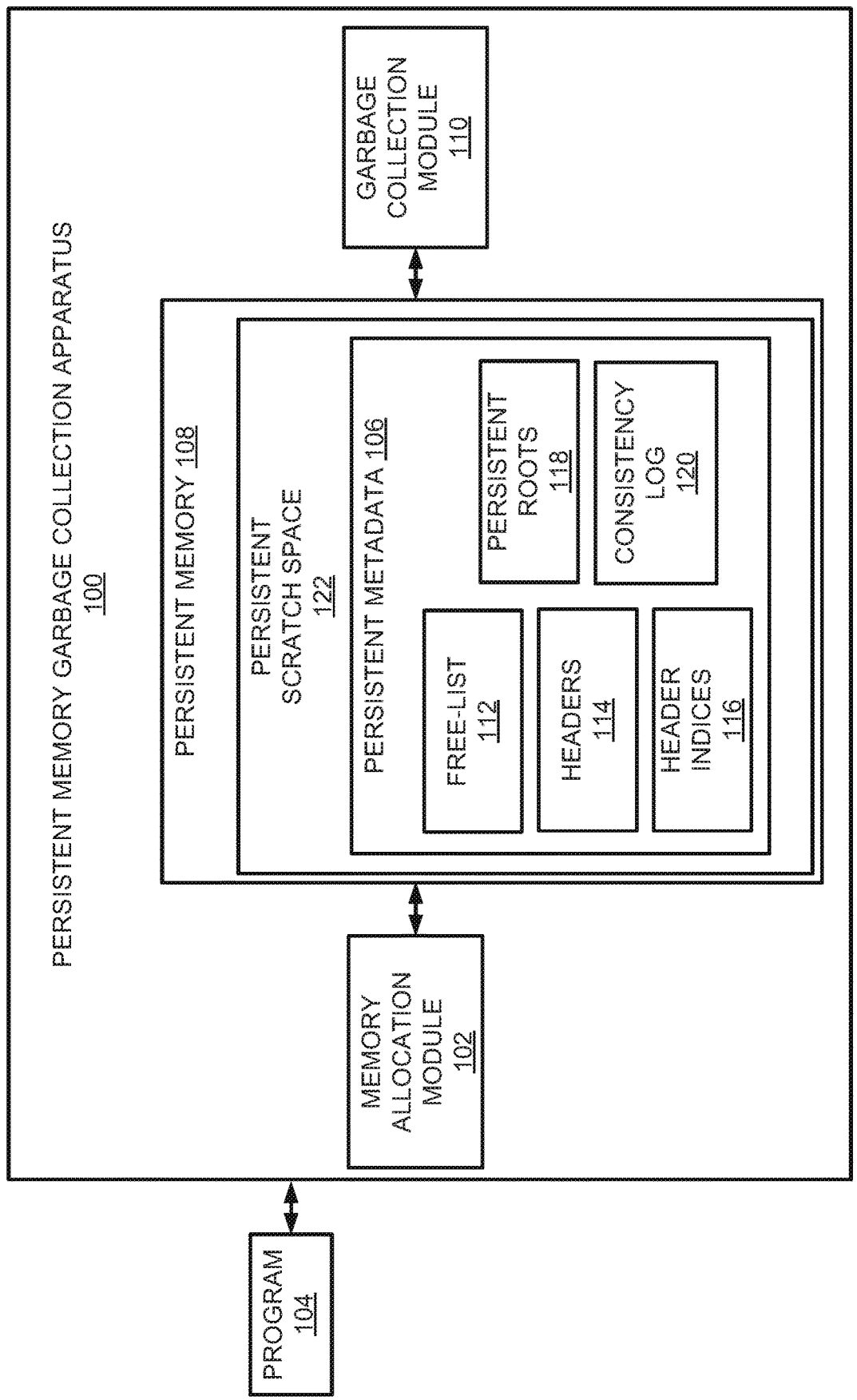
FIG. 1 illustrates an architecture of a persistent memory garbage collection apparatus, according to an example of the present disclosure.

FIG. 1 illustrates an architecture of a persistent memory garbage collection apparatus (hereinafter also referred to as "apparatus 100"), according to an example of the present disclosure. Referring to FIG. 1, the apparatus 100 is depicted as including a memory allocation module 102 to determine whether termination of a program 104 is based on a specified termination (e.g., an exit during or after program execution, etc.) of the program 104 during execution of the program 104, or an unspecified termination (e.g., process failures, kernel panics, power outages, etc.) of the program 104 during the execution of the program 104. In response to a determination that the termination of the program 104 is based on the specified termination of the program 104 during the execution of the program 104, the memory allocation module 102 may utilize persistent metadata 106 stored in a persistent memory 108 to restart the program 104. Further, in response to a determination that the termination of the program 104 is based on the unspecified termination of the program 104 during the execution of the program 104, the memory allocation module 102 may operate in conjunction with a garbage collection module 110 to utilize the persistent metadata 106 stored in the persistent memory 108 to collect garbage from the persistent memory 108 and to restart the program 104.

The MMS of the apparatus 100 that is implemented by the memory allocation module 102 may acquire persistent memory 108, for example, from an underlying system, and use the persistent memory 108 to fulfill requests from various applications. The persistent memory 108 may persist persistent metadata 106 related to past actions of the memory allocation module 102 and the garbage collection module 110 to create a consistent view of the memory space that is under the management of the memory allocation module 102 upon restart of a program that uses the persistent memory 108. The memory allocation module 102 may avoid memory leaks as a result of failure, and avoid user data corruption in a persistent heap due to memory management errors such as multiple allocations or deallocations of the same space. The persistent metadata 106 that is needed across restarts of a program that uses the persistent memory 108 may be sorted into a persistent data structure, with the consistency of the persistent metadata 106 being ensured before use thereof. Any temporary metadata which does not need to be persisted across restarts may be maintained in transient memory.

The persistent metadata 106 may include metadata related to a free-list 112, headers 114, header indices 116, persistent roots 118, and consistency log 120. The free-list 112 may generally identify the persistent memory 108 that has not been allocated. The headers 114 may generally identify allocated memory objects within an associated memory page of the persistent memory 108. The headers 114 of allocated chunks of the persistent memory 108 may specify information such as the size of allocation. The header indices 116 may generally map given memory page addresses to memory locations in the persistent memory 108 where the header information for corresponding memory pages are stored. The persistent roots 118 may generally identify the starting addresses of each separately managed persistent heap existing within a persistent region. The consistency log 120 may generally identify modifications related to allocation of the persistent memory 108.

The apparatus 100 may use a persistent heap which includes a collection of objects with possible pointers among them. For an object to be persisted, the object is allocated out of a persistent heap. As described with reference to FIG. 2, a persistent heap may include a persistent root (or a plurality of roots) that is in turn allocated out of the same persistent heap, and is hence persistent. With respect to garbage collection in this environment, at stable execution points (e.g., after program termination), any object within a persistent heap not reachable from any of the persistent roots of the object may be considered garbage and reclaimed. Alternatively, during program execution, any object within a persistent heap obeys the natural invariant that if the object is not reachable from any persistent heap roots or any program roots (e.g., from the stack and registers), the object may be considered garbage and reclaimed.

The MMS of the apparatus 100 may allocate the persistent metadata 106 into a persistent scratch space 122 of the persistent memory 108. The persistent scratch space 122 may be acquired separately from the persistent heap space, and may not be garbage collected. A persistent bump pointer may be used to track the free space of the persistent scratch space 122. With the exception of page headers, no objects allocated in the persistent scratch space 122 may be deallocated. Deallocated header spaces may be reused to fulfill new header requests by maintaining such spaces in the free-list 112 known as header free-list. Both the space acquisition and the update to the free space bump pointer may occur failure atomically to avoid any failure induced memory leaks. The free space may be expanded as needed by acquiring more memory from the persistent memory 108. Any newly acquired space may be contiguous or separated from the previous space. For the persistent scratch space, some memory may not be used at the end of a persistent scratch space due to a mismatch between the size of the object being allocated and the remaining memory.

Isolation of the persistent metadata 106 from the persistent heap space may provide additional security against inadvertent corruption of the persistent metadata 106, and facilitate locality of reference for both the persistent metadata 106 and user data. An MMS initialization routine may be used to return the start address of the first persistent scratch space.

For the apparatus 100, garbage collection may be performed by the garbage collection module 110 in an online mode, an offline mode, or both. An online mode of the garbage collection module 110 may refer to garbage collection as a program (i.e., machine readable instructions) is executing. An offline mode of the garbage collection module 110 may refer to garbage collection during the recovery phase if program execution is interrupted by a failure. The online or offline modes of the garbage collection module 110 may reclaim garbage created, for example, by program error and by failures. However, the offline mode of the garbage collection module 110 may operate independently of program execution. For the offline mode operation of the garbage collection module 110, ambiguous program roots such as stacks and registers may be omitted, and operation of the garbage collection module 110 may instead begin from well-identified persistent heap roots.

The garbage collection internal data structures that are accessed by the garbage collection module 110 may include transient and persistent data structures. With respect to separation of transient and persistent garbage collection internal data structures, a minimum core set of persistent data structures without which the memory allocation module 102 cannot function after re-execution may be maintained as the persistent metadata 106. The minimum core set of persistent data structures may be manipulated with failure-atomic CPU instructions. Whenever the minimum core set of persistent data structures are not manipulated with failure-atomic CPU instructions, the consistency of the minimum core set of persistent data structures may be maintained either by garbage collection internal logging (i.e., by the consistency log 120) or using shadowing techniques. The core data structures may include, for example, the free-list 112, the headers 114, the header indices 116, the persistent roots 118, and the consistency log 120.

The free-list 112 of the memory allocation module 102 may represent the persistent memory 108 that has not been allocated. The free-list 112 may be maintained in the persistent metadata 106 of the persistent memory 108 in a failure-resilient manner. For example, all modifications related to the free-list 112 may be logged in the consistency log 120, which may be replayed in the event of a failure. The consistency of the free-list 112 may be maintained regardless of failures. Thus, updates to the free-list 112 may be logged to the consistency log 120 during program execution. Before updating any element of the free-list 112, the location being updated and its previous value may be entered into the consistency log 120. If a failure occurs during the update to the free-list 112, the consistency log 120 entries may be replayed during recovery to revert the free-list 112 back to a consistent state.

According to another example, since generating the consistency log 120 and maintaining order between logging and free-list updates may be compute intensive, an alternative may be to forego maintaining consistency of the free-list 112 in the presence of failures. The free-list 112 may be specified as being consistent if a program terminates successfully. A bit maintained in the implementation may track the status of program termination. In the event of successful program termination, the free-list 112 may be reused. However, in the event of a failure, the free-list 112 may be discarded and the recovery phase may rebuild the free-list 112. For example, the free-list 112 may be rebuilt from the headers 114 maintained in the persistent metadata 106 for every page. Thus persistent data structures may be maintained for communication across successive executions without the overhead of maintaining consistency.

Generally, the free-list 112 may be visible in the persistent memory 108. For example, the free-list may be flushed out of volatile CPU buffers and caches.

The free-list 112 may include an object free-list and a page free-list. The object free-list may represent a singly linked list of free persistent memory objects whose sizes are less than a page. A persistent memory object is a contiguous chunk of memory identified by a unique starting address. According to an example, the object free-list may be segregated by size (e.g., granules) that are multiples of two, and start at sixteen bytes (e.g., one granule=sixteen bytes). The granules for which the object free-list exists up to the maximum number of granules supported may depend on the persistent memory 108 requests that have been received. For example, an object free-list for thirty-two bytes may not exist if a request for such an object free-list has not been received. Each of these object free-lists may be reachable through a pointer element in an array. In this array, which has the same number of pointer elements as the maximum number of granules supported, an $i^{th}$ pointer element may point to the object free-list of i granules. This array may also be allocated at a known location within the first persistent scratch space 122. A link to the next object in the object free-list may be installed within the object (last sixty-four bits of the unallocated object in object free-list). The object free-list may be maintained in the persistent scratch space 122 so that any unallocated object in the object free-list is not lost temporarily, where next garbage collection will eventually find such an unallocated object, across normal restarts. The failure consistency of the object free-list may be maintained in the absence of failure. In case of a failure, the garbage collection module 110 may be used rebuild the object free-list.

With respect to the page free-list of the free-list 112, contiguous free space that is page-sized or larger may be stored in the page free-list. Similar to the object free-list, the free unallocated space of the persistent memory 108 may be segregated by the number of pages up to a threshold (e.g., sixty pages). Contiguous spaces with a number of pages higher than the threshold may be stored in the last page free-list (e.g., 60+ pages free-list). Each of these page free-lists may be reachable through a pointer element in an array allocated at a known location within the initial search space of the persistent memory 108. In this array, an $i^{th}$ element is a pointer to the page free-list with i number of pages. The consistency of the page free-list may be implemented in the absence of failure.

For the persistent metadata 106, the MMS may use state and transactional logs to update the persistent metadata 106. Within the initial persistent scratch space 122, a pre-defined amount of space may be allocated for creating the consistency log 120. As is the case of persistent root space, space for the consistency log 120 may be allocated at a known offset in the initial persistent heap.

A mark stack may be maintained in transient memory and is an example of a transient garbage collection internal data structure. On re-execution, the persistent mark bits may be used to skip over the task already performed in the previous execution. Maintaining the mark stack in transient memory avoids the overhead of failure-resilience, with minimal loss with respect to performance of the memory allocation module 102.

Mark bits, that indicate whether a particular chunk of the persistent memory 108 is reachable, may be maintained in the persistent memory 108. The mark bits may be updated using failure-atomic CPU instructions.

With respect to allocation of specific metadata to the persistent metadata 106, the MMS of the apparatus 100 may maintain information with respect to all allocated memory objects within a page in a header for that page. For the MMS, all of the objects contained in a page may be of the same size. The aspect of the same page size may provide for the maintenance of a single header for all objects in a page. The aspect of the same page size may also reduce the number of items whose failure consistency has to be maintained, thus reducing the overall failure consistency overhead of the MMS. The object free-list may be refilled by splitting a page from a contiguous block in the page free-list, allocating the memory space into multiple objects of the same granule, and adding the objects to the appropriate free-list. A single header may be installed for a page, and a size field for the header may be updated to indicate the size of memory objects in that page. Each first page of a contiguous free space in the page free-list may also include a header. In this case the size field of the header may include the total size in bytes of the contiguous space. A header may also include a mark bits field to mark each memory object in a page as reachable or unreachable.

Figure 5:
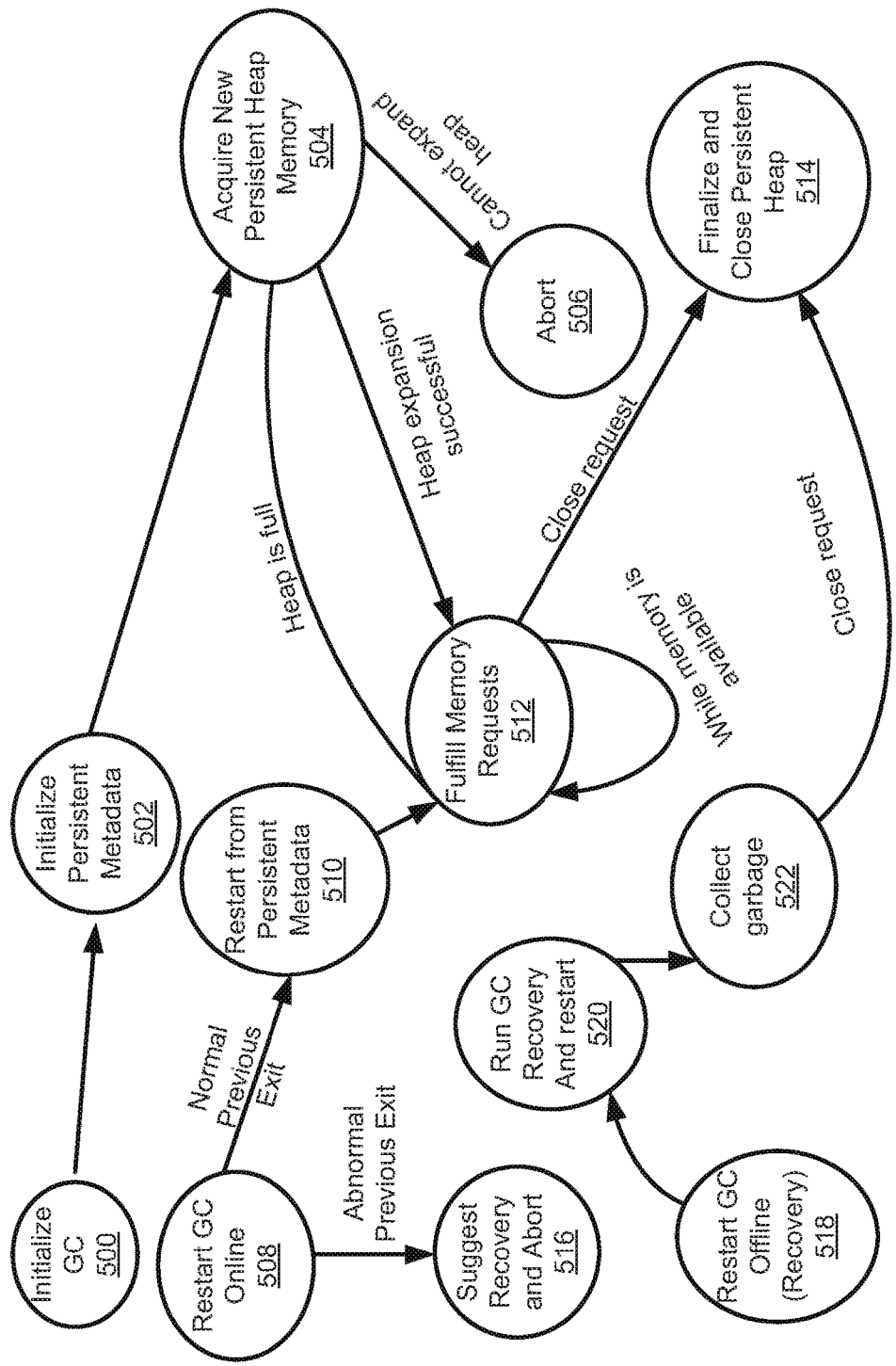
FIG. 5 illustrates various stages in the management of persistent memory; according to an example of the present disclosure.

FIG. 5 illustrates various stages in the management of the persistent memory 108, according to an example of the present disclosure.

Referring to FIG. 5, at 500, the garbage collection module 110 may be initialized.

At 502, the persistent metadata 106 may be initialized.

At 504, the memory allocation module 102 may acquire new persistent heap memory from the persistent memory 108.

If the persistent heap cannot be expanded (e.g., due to size limitations or other factors), at 506, further processing may be aborted.

At 508, the with respect to online operation, the garbage collection module 110 may initiate the online restart process.

At 510, in the event of normal termination of a program, online restart may include restarting by using the persistent metadata 106.

At 512, a memory request to the persistent memory 108 may be fulfilled. With respect to fulfillment of the memory request to the persistent memory 108, if a persistent heap is full, at 504, the memory allocation module 102 may acquire new persistent heap memory from the persistent memory 108.

At 514, the memory request at 512 may be closed, and the persistent heap may be closed.

At 516, in the event of abnormal termination of a program, offline recovery may be recommended, and further processing may be aborted.

At 518, with respect to offline operation, the garbage collection module 110 may initiate the offline recovery process.

At 520, garbage collection may be executed to initiate recovery and restart.

At 522, garbage may be collected from the persistent memory 108. At 514, the persistent heap may be closed.

Referring to FIG. 5, with respect to initialization at 500, the MMS may acquire a space for the initial persistent scratch space 122, allocate all pertinent data structures, and acquire the initial persistent heap space. At the end of the initialization, the MMS may store a restart number in the initial persistent scratch space 122, set a consistency flag to FAILED, and return the starting address of the initial persistent scratch space 122. The restart number may be used by restart code (i.e., machine readable instructions) to verify that a given address is indeed a start of the properly initialized initial persistent scratch space 122.

With respect to normal restart and recovery at 510, the MMS may check if the start address provided is a start of a properly initialized MMS metadata, and initialize itself using the stored data. If the MMS detects a FAILED previous exit, the MMS may first replay the consistency log 120. Next, if needed, the MMS may recreate some of the data structures of the persistent memory 108. At the end of the recovery, the MMS may accept any memory management requests, including request for offline garbage collection. Any failure before the end of a successful restart phase may leave the MMS in the same state as it was at the beginning of the restart.

With respect to offline garbage collection at 520, offline garbage collection may start at the request of the user-application and/or API. The offline garbage collection may include allocation of a mark stack in the transient scratch space to hold memory objects in the persistent heap that are to be analyzed by the mark process.

With respect to the mark phase associated with garbage collection at 522 and 524, the MMS may iterate through a set of persistent root pointers and push the persistent root pointers into the mark stack. Next, the MMS may pop a memory object from the mark stack at a time, and examine, for example, each eight-byte aligned bits within the object for a potential memory reference. For each bit pattern conservatively determined to be a memory reference, the MMS may set the mark bit (as reachable) for the memory object referenced by the memory reference. The MMS may then push the referenced memory object into the mark stack. In the case of mark stack overflow, the MMS may empty the mark stack by exploring each object in the mark stack. The MMS may then resize the mark stack and rescan the entire persistent heap for pointers from the explored objects to the unexplored objects. A failure during the mark phase does not leave the MMS in an inconsistent state, in which case, the collection of memory objects may be completed on restart.

With respect to the sweep phase associated with garbage collection at 522 and 524, before start of the sweep phase, the MMS may release all memory objects in the free-list 112 and reclaim list, and rebuild the reclaim list from scratch. The reclaim list may include a list of memory pages where all reachable memory objects (memory objects currently in use) have been marked, but the free memory objects within the page have not yet been reclaimed and added to the object free-list. In order to build the reclaim list, the MMS may iterate through each bucket node in a tree. The MMS may fetch each header in the bucket node with a valid address, and examine the flags. For each header whose flag is set to ASSIGNED, the MMS may examine the mark bits. If none of the marks bits are set, then the entire free page may be flagged as FREE and returned to the page free-list. The MMS may attempt to coalesce the free page with immediately preceding or succeeding adjacent free space before returning the free page to the page free-list. If some mark bits are set in its header, the free page may be returned to the appropriate reclaim list based on the size of the object stored by the free page. A failure during the coalescing of free pages may leave the MMS in an inconsistent state or leak memory. Any memory page for which a header has not been installed may be considered a leak as it is unreachable. During the coalescing of a memory page, a memory page or a set of contiguous memory pages may not have a corresponding header momentarily, or more than one header may account for the same memory page. Furthermore, a header that is available as a result of coalescing may be added to the header free-list atomically to avoid leaking the persistent scratch space 122. The header free-list may include persistent memory objects which at some point were used to store header information of some memory page, but currently is free and may be used to store header information of another page in the future.

With respect to persistent heap expansion at 504, a space acquired from the persistent memory 108 may not be available to the memory allocation module 102 until a header has been installed for the space and added to the page free-list. A new header may be allocated and installed in a header index tree and the memory space may be added to page free-list. The MMS may coalesce the new space with the preceding or succeeding contiguous preceding free space in the page free-list.

With respect to allocation and deallocation of the persistent memory 108, all allocations up to a maximum granule size may be fulfilled from the object free-list. A failure does not affect the object free-list as the object free-list may be discarded during a full garbage collection in a recovery phase. Allocations that are equal to the size of a page or larger, or refilling of an empty object free-list of a particular size may be fulfilled using the memory space in the page free-list. In such a case, a contiguous space in the page free-list may be divided into two halves such that the first half is either a single page used for refilling the object free-list, or is a collection of pages equal to the requested size of an allocation (rounded up to a multiple of a memory page size). For the second unallocated half, a new header may be allocated, the size of the unallocated half may be updated to reflect the size of the unallocated space, the flag in the header of the unallocated half may be updated to FREE, and a new header for the unallocated half may be installed in a header index table. The second unallocated half may be added to the page free-list appropriate to the new size of the second unallocated half. With respect to the header for a first page of the first half, a size field may be updated to the rounded requested size, and the flag may be set to ASSIGNED from FREE. The header installation for the first allocated half may further involve allocating a new bucket in the header index table. If the allocated first half is a large allocation containing multiple pages, a forwarding address may be installed. A failure in the middle of a crash may potentially cause memory leak in terms of a lost second half if the failure occurs before the installation of a header. Such a failure may leave dangling pointers in the free-list 112 or in the header index table. Due to a failure, the sizes for the two halves may not be consistent, which may result in a memory leak or memory corruption.

A deallocation of an object smaller than a page may be performed by looking up the header for the given address, by obtaining the object size information from the header, and appending the object to the free-list 112 appropriate to the size of the object. The deallocation of the large object may involve returning the object to the page free-list in the same manner as the sweep phase would return an entirely empty page, and hence poses the same failure aspects. A relatively large object (e.g., more than one page) may include a forwarding address that needs to be set back to zero in the header index table's bucket node entries. An incomplete resetting of the forwarding address may be completed during the recovery phase after a failure during the process which may be detected using a flag.

With respect to memory management termination, as a part of the call to garbage collection closes, the MMS may ensure that all persistent memory updates which have not yet been specified as being visible, but are needed for consistency, are made visible. Thus all updated addresses waiting to be flushed from volatile cache may be flushed ensuring that all updates to persistent data structures which are needed for consistency are visible in the persistent memory 108. The MMS may then set the MMS consistency state from FAILED to NORMAL.

The modules and other elements of the apparatus 100 may be machine readable instructions stored on a non-transitory computer readable medium. In this regard, the apparatus 100 may include or be a non-transitory computer readable medium. In addition, or alternatively, the modules and other elements of the apparatus 100 may be hardware or a combination of machine readable instructions and hardware.

Figure 8:
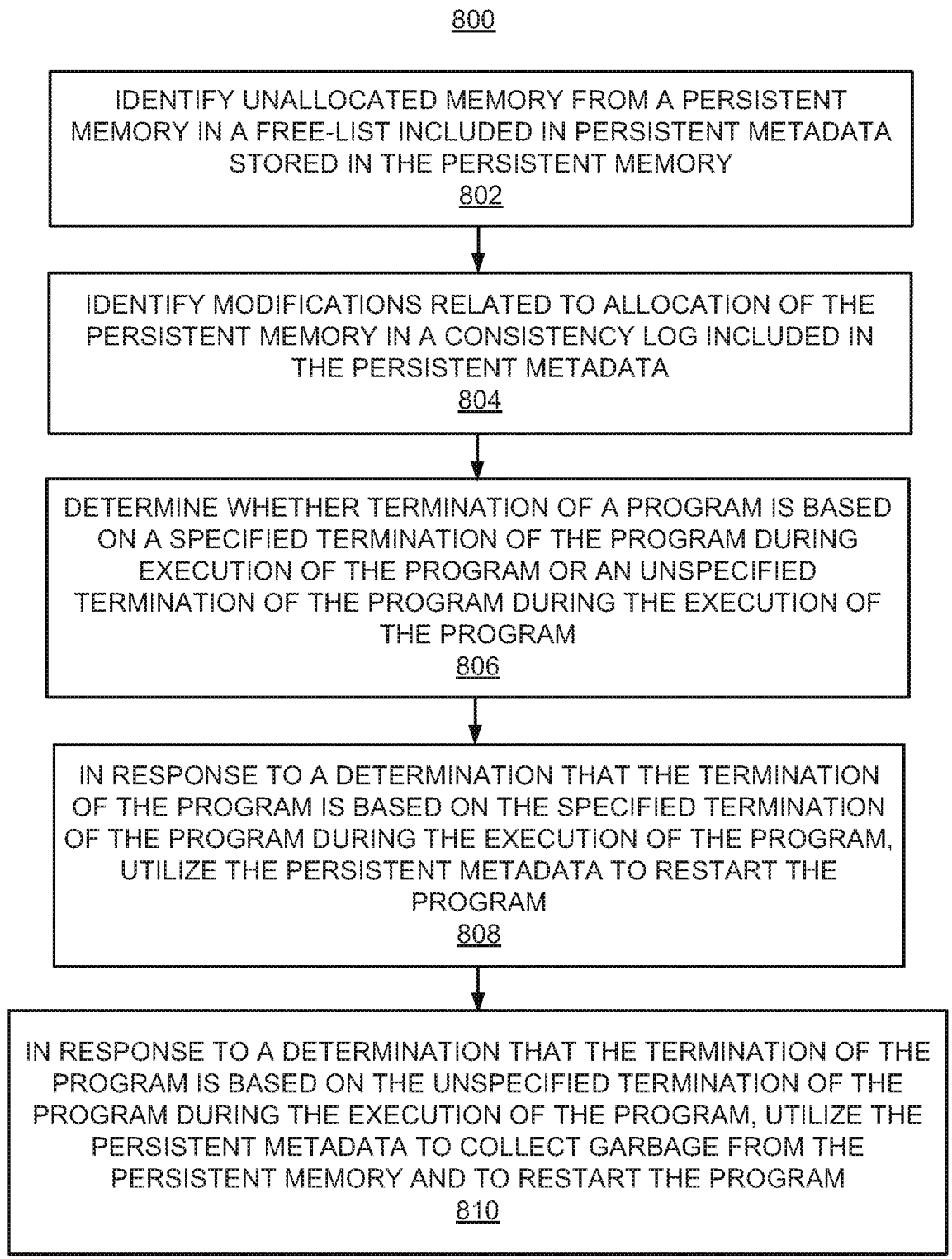
FIG. 8 illustrates further details of the method for persistent memory garbage collection, according to an example of the present disclosure.

FIGS. 6-8 respectively illustrate flowcharts of methods 600, 700, and 800 for persistent memory garbage collection, corresponding to the example of the persistent memory garbage collection apparatus 100 whose construction is described in detail above. The methods 600, 700, and 800 may be implemented on the persistent memory garbage collection apparatus 100 with reference to FIGS. 1, 2, and 5 by way of example and not limitation. The methods 600, 700, and 800 may be practiced in other apparatus.

Referring to FIG. 6, for the method 600, at block 602, the method may include determining whether termination of a program is based on a specified termination of the program during execution of the program or an unspecified termination of the program during the execution of the program. For example referring to FIG. 1, the memory allocation module 102 may determine whether termination of the program 104 is based on a specified termination (e.g., an exit during or after program execution, etc.) of the program 104 during execution of the program 104, or an unspecified termination (e.g., process failures, kernel panics, power outages, etc.) of the program 104 during the execution of the program 104.

At block 604, in response to a determination that the termination of the program is based on the specified termination of the program during the execution of the program, the method may include utilizing persistent metadata stored in a persistent memory to restart the program. For example referring to FIG. 1, in response to a determination that the termination of the program 104 is based on the specified termination of the program 104 during the execution of the program 104, the memory allocation module 102 may utilize persistent metadata 106 stored in the persistent memory 108 to restart the program 104.

At block 606, in response to a determination that the termination of the program is based on the unspecified termination of the program during the execution of the program, the method may include utilizing the persistent metadata stored in the persistent memory to collect garbage from the persistent memory and to restart the program. For example referring to FIG. 1, in response to a determination that the termination of the program 104 is based on the unspecified termination of the program 104 during the execution of the program 104, the memory allocation module 102 may operate in conjunction with the garbage collection module 110 to utilize the persistent metadata 106 stored in the persistent memory 108 to collect garbage from the persistent memory 108 and to restart the program 104.

According to an example, utilizing the persistent metadata stored in the persistent memory to collect the garbage from the persistent memory and to restart the program may further include collecting the garbage from the persistent memory in an offline mode that is independent of the execution of the program.

According to an example, the method 600 may further include identifying unallocated memory from the persistent memory in a free-list (e.g., the free-list 112) based on the collection of the garbage from the persistent memory, storing the free-list in the persistent metadata, and utilizing the free-list to determine the unallocated memory to restart the program.

According to an example, the method 600 may further include identifying unallocated memory from the persistent memory in a free-list, in response to the determination that the termination of the program is based on the specified termination of the program during the execution of the program, designating the free-list as being consistent, and utilizing the free-list to restart the program.

According to an example, the method 600 may further include identifying unallocated memory from the persistent memory in a free-list, in response to the determination that the termination of the program is based on the unspecified termination of the program during the execution of the program, designating the free-list as being inconsistent, and discarding the free-list. The method 600 may further include generating a new free-list to identify the unallocated memory from the persistent memory in the new free-list, storing the new free-list in the persistent metadata, and utilizing the new free-list to restart the program.

According to an example, the method 600 may further include identifying unallocated memory from the persistent memory in a free-list that includes an object free-list and a page free-list. The object free-list may represent free objects whose size may be less than a memory page of the persistent memory, and the page free-list may represent free memory pages of the persistent memory.

According to an example, the method 600 may further include identifying allocated memory objects within an associated memory page of the persistent memory in headers (e.g., the headers 114), storing the headers in the persistent metadata, and utilizing the headers to determine the allocated memory objects to collect the garbage from the persistent memory and to restart the program.

According to an example, the method 600 may further include identifying modifications related to allocation of the persistent memory in a consistency log (e.g., the consistency log 120), storing the consistency log in the persistent metadata, and utilizing the consistency log to determine the modifications related to the allocation of the persistent memory to collect the garbage from the persistent memory and to restart the program. According to an example, the modifications may include current and previous values related to the allocation of the persistent memory.

Referring to FIG. 7, for the method 700, at block 702, the method may include determining whether termination of a program is based on a specified termination of the program during execution of the program or an unspecified termination of the program during the execution of the program. For example referring to FIG. 1, the memory allocation module 102 may determine whether termination of the program 104 is based on a specified termination (e.g., an exit during or after program execution, etc.) of the program 104 during execution of the program 104, or an unspecified termination (e.g., process failures, kernel panics, power outages, etc.) of the program 104 during the execution of the program 104.

At block 704, in response to a determination that the termination of the program is based on the specified termination of the program during the execution of the program, the method may include utilizing persistent metadata stored in a persistent memory to restart the program. For example referring to FIG. 1, in response to a determination that the termination of the program 104 is based on the specified termination of the program 104 during the execution of the program 104, the memory allocation module 102 may utilize persistent metadata 106 stored in the persistent memory 108 to restart the program 104.

At block 706, the method may include determining an offline mode that is independent from the execution of the program. For example referring to FIG. 1, the memory allocation module 102 may determine an offline mode that is independent from the execution of the program 104.

At block 708, in response to a determination that the termination of the program is based on the unspecified termination of the program during the execution of the program, the method may include utilizing the persistent metadata stored in the persistent memory to collect garbage from the persistent memory in the offline mode and to restart the program. For example referring to FIG. 1, in response to a determination that the termination of the program 104 is based on the unspecified termination of the program 104 during the execution of the program 104, the memory allocation module 102 may operate in conjunction with the garbage collection module 110 to utilize the persistent metadata 106 stored in the persistent memory 108 to collect garbage from the persistent memory 108 in an offline mode that is independent of the execution of the program and to restart the program 104.

According to an example, the method 700 may further include storing the persistent metadata in a persistent scratch space of the persistent memory, and isolating the persistent scratch space from the collection of the garbage from the persistent memory.

According to an example, the method 700 may further include identifying unallocated memory from the persistent memory in a free-list, storing the free-list in the persistent metadata, and utilizing the free-list to determine the unallocated memory to collect the garbage from the persistent memory and to restart the program.

According to an example, the method 700 may further include placing mark bits in the persistent memory, updating the mark bits according to a specified procedure, collecting, subsequent to a mark phase, all unmarked objects from the persistent memory, and adding the unmarked objects that are collected to a free-list in the persistent memory. For example, with respect to a mark and sweep operation, mark bits that indicate whether a particular chunk of the persistent memory 108 is reachable may be maintained in the persistent memory 108. The mark bits may be updated according to a specified procedure (e.g., the mark bits may be updated using failure-atomic CPU instructions). Subsequent to a mark phase, all unmarked objects may be collected from the persistent memory 108, and the unmarked objects that are collected may be added to the free-list 112 in the persistent memory.

Referring to FIG. 8, for the method 800, at block 802, the method may include identifying unallocated memory from a persistent memory in a free-list included in persistent metadata stored in the persistent memory. For example referring to FIG. 1, the memory allocation module 102 may identify unallocated memory from the persistent memory 108 in the free-list 112 included in persistent metadata 106 stored in the persistent memory 108.

At block 804, the method may include identifying modifications related to allocation of the persistent memory in a consistency log included in the persistent metadata. For example referring to FIG. 1, the memory allocation module 102 may identify modifications related to allocation of the persistent memory 108 in the consistency log 120 included in the persistent metadata 106.

At block 806, the method may include determining whether termination of a program is based on a specified termination of the program during execution of the program or an unspecified termination of the program during the execution of the program. For example referring to FIG. 1, the memory allocation module 102 may determine whether termination of the program 104 is based on a specified termination (e.g., an exit during or after program execution, etc.) of the program 104 during execution of the program 104, or an unspecified termination (e.g., process failures, kernel panics, power outages, etc.) of the program 104 during the execution of the program 104.

At block 808, in response to a determination that the termination of the program is based on the specified termination of the program during the execution of the program, the method may include utilizing persistent metadata stored in a persistent memory to restart the program. For example referring to FIG. 1, in response to a determination that the termination of the program 104 is based on the specified termination of the program 104 during the execution of the program 104, the memory allocation module 102 may utilize persistent metadata 106 stored in the persistent memory 108 to restart the program 104.

At block 810, in response to a determination that the termination of the program is based on the unspecified termination of the program during the execution of the program, the method may include utilizing the persistent metadata stored in the persistent memory to collect garbage from the persistent memory and to restart the program. For example referring to FIG. 1, in response to a determination that the termination of the program 104 is based on the unspecified termination of the program 104 during the execution of the program 104, the memory allocation module 102 may operate in conjunction with the garbage collection module 110 to utilize the persistent metadata 106 stored in the persistent memory 108 to collect garbage from the persistent memory 108 and to restart the program 104.

According to an example, in response to the determination that the termination of the program is based on the specified termination of the program during the execution of the program, the method 800 may further include designating the free-list as being consistent, and utilizing the free-list to restart the program.

According to an example, in response to the determination that the termination of the program is based on the unspecified termination of the program during the execution of the program, the method 800 may further include designating the free-list as being inconsistent, generating a new free-list to identify the unallocated memory from the persistent memory in the new free-list, and storing the new free-list in the persistent metadata. The method 800 may further include utilizing the new free-list to restart the program.

Figure 9:
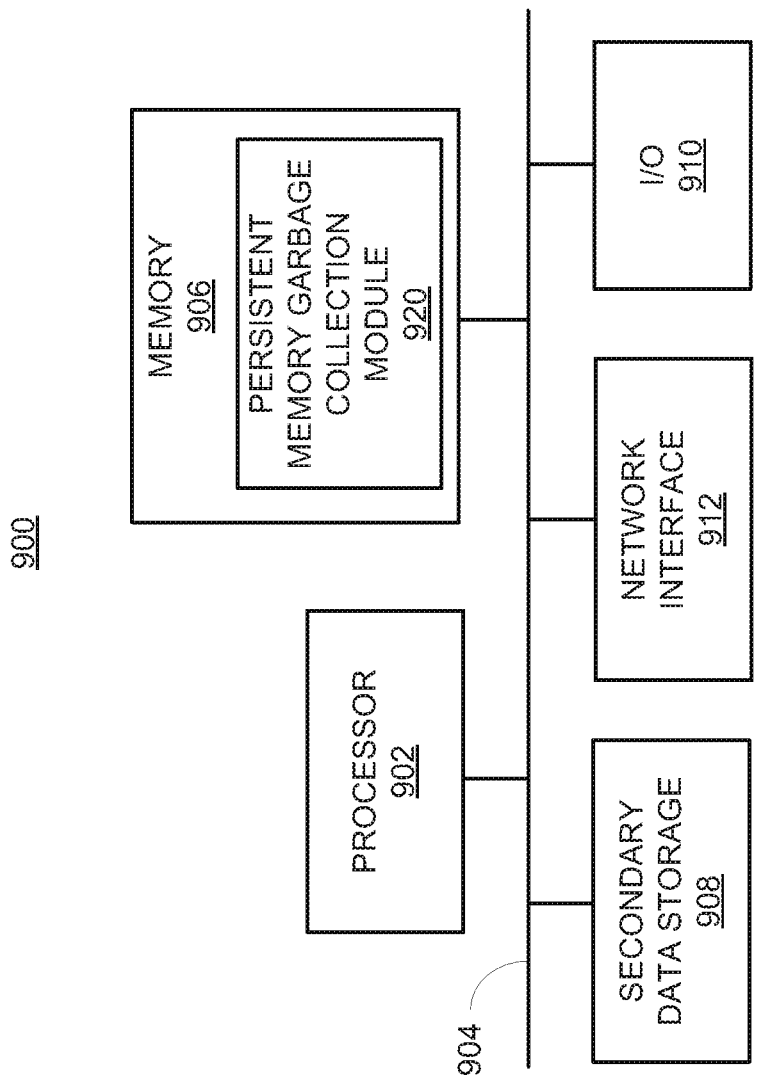
FIG. 9 illustrates a computer system, according to an example of the present disclosure.

FIG. 9 shows a computer system 900 that may be used with the examples described herein. The computer system 900 may represent a generic platform that includes components that may be in a server or another computer system. The computer system 900 may be used as a platform for the apparatus 100. The computer system 900 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g.; RAM (random access memory), ROM (read only memory), EPROM (erasable, programmable ROM), EEPROM (electrically erasable, programmable ROM); hard drives, and flash memory).

The computer system 900 may include a processor 902 that may implement or execute machine readable instructions performing some or all of the methods, functions and other processes described herein. Commands and data from the processor 902 may be communicated over a communication bus 904. The computer system may also include a main memory 906, such as a random access memory (RAM), where the machine readable instructions and data for the processor 902 may reside during runtime, and a secondary data storage 908, which may be non-volatile and stores machine readable instructions and data. The memory and data storage are examples of computer readable mediums. The memory 906 may include a persistent memory garbage collection module 920 including machine readable instructions residing in the memory 906 during runtime and executed by the processor 902. The persistent memory garbage collection module 920 may include the modules of the apparatus 100 shown in FIG. 1.

The computer system 900 may include an I/O device 910, such as a keyboard, a mouse, a display, etc. The computer system may include a network interface 912 for connecting to a network. Other known electronic components may be added or substituted in the computer system.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A method for persistent memory garbage collection, the method comprising:

determining, by a processor, whether termination of a program is based on a specified termination of the program during execution of the program or an unspecified termination of the program during the execution of the program;

identifying unallocated memory from a persistent memory in a free-list data structure that includes an object free-list and a page free-list, wherein:

the free-list data structure is maintained in persistent metadata of the persistent memory to identify portions of the persistent memory that have not been allocated, the object free-list is a singly-linked list of the free objects that includes a link to a next object in the singly-linked list, and the page free-list comprises contiguous free space that is page-sized or larger;

in response to a determination that the termination of the program is based on the specified termination of the program during the execution of the program, utilizing the persistent metadata stored in the persistent memory to restart the program, wherein the persistent metadata comprises a first root address associated with a persistent heap of data;

in response to a determination that the termination of the program is based on the unspecified termination of the program during the execution of the program:
   determining a data object within the persistent heap of data is not reachable by a second root address associated with the data object;
   initiating a reclaiming process to associate the data object with garbage and to restart the program, wherein the reclaiming processes comprises:
      releasing memory objects in the free-list data structure and a reclaim list,
      rebuilding the reclaim list to include a list of memory pages where memory objects in use have been marked, but free memory objects have not yet been reclaimed, and
      refilling the object-free list of the free-list data structure by splitting the contiguous free space from the page-free list of the free-list data structure; and
   responsive to completing the reclaiming process, closing the persistent heap of data.

2. The method of claim 1, wherein associating the data object with the garbage is initiated in an offline mode that is independent of the execution of the program.

3. The method of claim 1, further comprising:
identifying the unallocated memory from the persistent memory in the free-list data structure based on the collection of the garbage from the persistent memory; and
utilizing the free-list data structure to determine the unallocated memory to restart the program.

4. The method of claim 1, further comprising:
in response to the determination that the termination of the program is based on the specified termination of the program during the execution of the program, designating the free-list data structure as being consistent; and
utilizing the free-list data structure to restart the program.

5. The method of claim 1, further comprising:
in response to the determination that the termination of the program is based on the unspecified termination of the program during the execution of the program, designating the free-list data structure as being inconsistent;
discarding the free-list data structure;
generating a new free-list data structure to identify the unallocated memory from the persistent memory in the new free-list data structure;
storing the new free-list data structure in the persistent metadata; and
utilizing the new free-list data structure to restart the program.

6. The method of claim 1, wherein the object free-list represents free objects whose size is less than a memory page of the persistent memory, and the page free-list represents free memory pages of the persistent memory.

7. The method of claim 1, further comprising:
identifying allocated memory objects within an associated memory page of the persistent memory in headers;
storing the headers in the persistent metadata; and
utilizing the headers to determine the allocated memory objects to collect the garbage from the persistent memory and to restart the program.

8. The method of claim 1, further comprising:
identifying modifications related to allocation of the persistent memory in a consistency log;
storing the consistency log in the persistent metadata; and
utilizing the consistency log to determine the modifications related to the allocation of the persistent memory to collect the garbage from the persistent memory and to restart the program.

9. The method of claim 8, wherein the modifications include current and previous values related to the allocation of the persistent memory.

10. A persistent memory garbage collection apparatus comprising:
a processor; and
a memory storing machine readable instructions that when executed by the processor cause the processor to:
   determine whether termination of a program is based on a specified termination of the program during execution of the program or an unspecified termination of the program during the execution of the program;
   identify unallocated memory from a persistent memory in a free-list data structure that includes an object free-list and a page free-list, wherein:
      the free-list data structure is maintained in persistent metadata of the persistent memory to identify portions of the persistent memory that have not been allocated,
      the object free-list is a singly-linked list of the free objects that includes a link to a next object in the singly-linked list, and
      the page free-list comprises contiguous free space that is page-sized or larger;
   in response to a determination that the termination of the program is based on the specified termination of the program during the execution of the program, utilize the persistent metadata stored in the persistent memory to restart the program, wherein the persistent metadata comprises a first root address associated with a persistent heap of data;
   determine a reclaiming process to associate a data object with garbage that is independent from the execution of the program; and
   in response to a determination that the termination of the program is based on the unspecified termination of the program during the execution of the program:
      determine the data object within the persistent heap of data is not reachable by a second root address associated with the data object;
      initiate the reclaiming process to associate the data object with garbage and to restart the program, wherein the reclaiming process comprises:
         releasing memory objects in the free-list data structure and a reclaim list,
         rebuilding the reclaim list to include a list of memory pages where memory objects in use have been marked, but free memory objects have not yet been reclaimed, and
         refilling the object-free list of the free-list data structure by splitting the contiguous free space from the page-free list of the free-list data structure; and
      responsive to completing the reclaiming process, close the persistent heap of data.

11. The persistent memory garbage collection apparatus according to claim 10, further comprising machine readable instructions to:

store the persistent metadata in a persistent scratch space of the persistent memory; and isolate the persistent scratch space from the collection of the garbage from the persistent memory.

12. The persistent memory garbage collection apparatus according to claim 10, further comprising machine readable instructions to:

place mark bits in the persistent memory;

update the mark bits according to a specified procedure;

collect, subsequent to a mark phase, all unmarked objects from the persistent memory; and add the unmarked objects that are collected to a free-list data structure in the persistent memory.

13. A non-transitory computer readable medium having stored thereon machine readable instructions to provide persistent memory garbage collection, the machine readable instructions, when executed, cause a processor to:

identify unallocated memory from a persistent memory in a free-list data structure included in persistent metadata stored in the persistent memory, wherein:

the free-list data structure includes an object free-list and a page free-list, the free-list data structure is maintained to identify portions of the persistent memory that have not been allocated, the object free-list is a singly-linked list of the free objects that includes a link to a next object in the singly-linked list, and the page free-list comprises contiguous free space that is page-sized or larger;

identify modifications related to allocation of the persistent memory in a consistency log included in the persistent metadata;

determine whether termination of a program is based on a specified termination of the program during execution of the program or an unspecified termination of the program during the execution of the program;

in response to a determination that the termination of the program is based on the specified termination of the program during the execution of the program, utilize the persistent metadata to restart the program, wherein the persistent metadata comprises a first root address associated with a persistent heap of data; and in response to a determination that the termination of the program is based on the unspecified termination of the program during the execution of the program:

determine a data object within the persistent heap of data is not reachable by a second root address associated with the data object;

initiate a reclaiming process to associate the data object with garbage and to restart the program, wherein the reclaiming process comprises:

releasing memory objects in the free-list data structure and a reclaim list, rebuilding the reclaim list to include a list of memory pages where memory objects in use have been marked, but free memory objects have not yet been reclaimed, and refilling the object-free list of the free-list data structure by splitting the contiguous free space from the page-free list of the free-list data structure; and responsive to completing the reclaiming process, close the persistent heap of data.

14. The non-transitory computer readable medium according to claim 13, further comprising machine readable instructions to:

in response to the determination that the termination of the program is based on the specified termination of the program during the execution of the program, designate the free-list data structure as being consistent; and utilize the free-list data structure to restart the program.

15. The non-transitory computer readable medium according to claim 13, further comprising machine readable instructions to:

in response to the determination that the termination of the program is based on the unspecified termination of the program during the execution of the program, designate the free-list data structure as being inconsistent;

generate a new free-list data structure to identify the unallocated memory from the persistent memory in the new free-list data structure;

store the new free-list data structure in the persistent metadata; and utilize the new free-list data structure to restart the program.

16. The method of claim 1, wherein the processor further initiates clflush instructions after the reclaiming process.

17. The method of claim 1, wherein the first root address identifies the starting memory address associated with the persistent heap of data in the persistent memory.

18. The method of claim 1, wherein the free-list data structure is reused following the specified termination, and wherein the free-list data structure is discarded and rebuilt following the unspecified termination.

19. The non-transitory computer readable medium according to claim 13, wherein the reclaiming process further comprises: releasing memory objects in the free list data structure and the reclaim list; and rebuilding the reclaim list to include a list of memory pages where memory objects in use have been marked, but free memory objects have not yet been reclaimed.

* * * * *